(No Model.) 2 Sheets—Sheet 1.

W. F. BARNES.
TOOL CARRIAGE FOR LATHES.

No. 427,494. Patented May 6, 1890.

Witnesses:
C. L. Southworth
J. A. Southworth

Inventor:
William F. Barnes
By A. O. Behel
Atty.

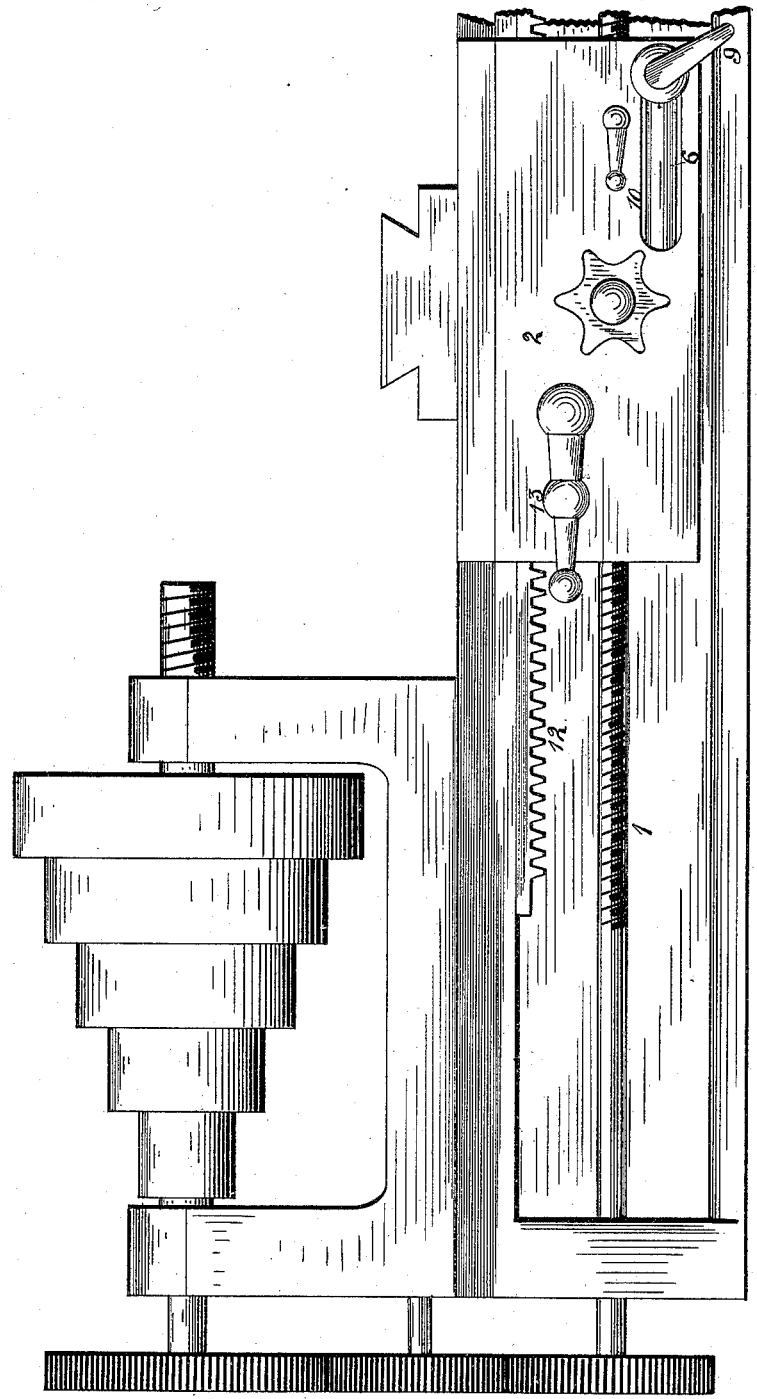

UNITED STATES PATENT OFFICE.

WILLIAM F. BARNES, OF ROCKFORD, ILLINOIS, ASSIGNOR TO THE W. F. & JOHN BARNES COMPANY, OF SAME PLACE.

TOOL-CARRIAGE FOR LATHES.

SPECIFICATION forming part of Letters Patent No. 427,494, dated May 6, 1890.

Application filed November 14, 1889. Serial No. 330,247. (No model.)

*To all whom it may concern:*

Be it known that I, WILLIAM F. BARNES, a citizen of the United States, residing at Rockford, in the county of Winnebago and State of Illinois, have invented certain new and useful Improvements in Tool-Carriages for Lathes, of which the following is a specification.

The object of this invention is to move the tool-carriage of a lathe in either direction, through the medium of friction mechanism, without stopping the rotation of its driving mechanism.

Figure 1:
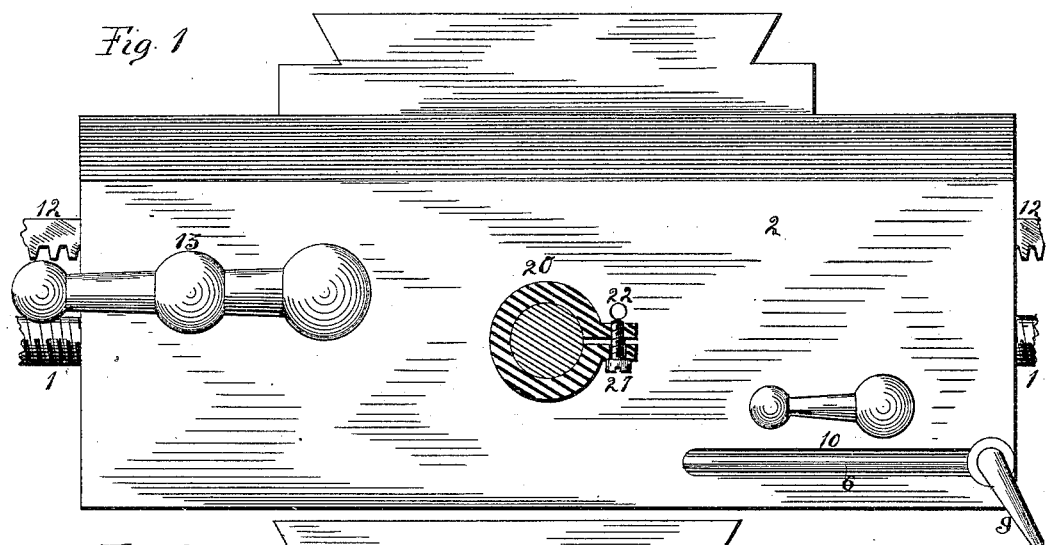
Figure 2:
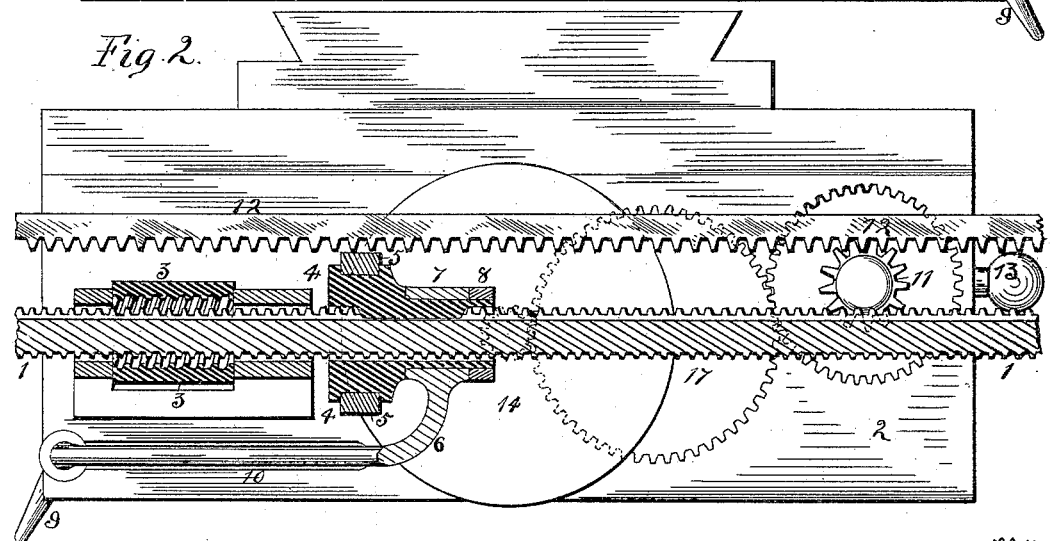
Figure 3:
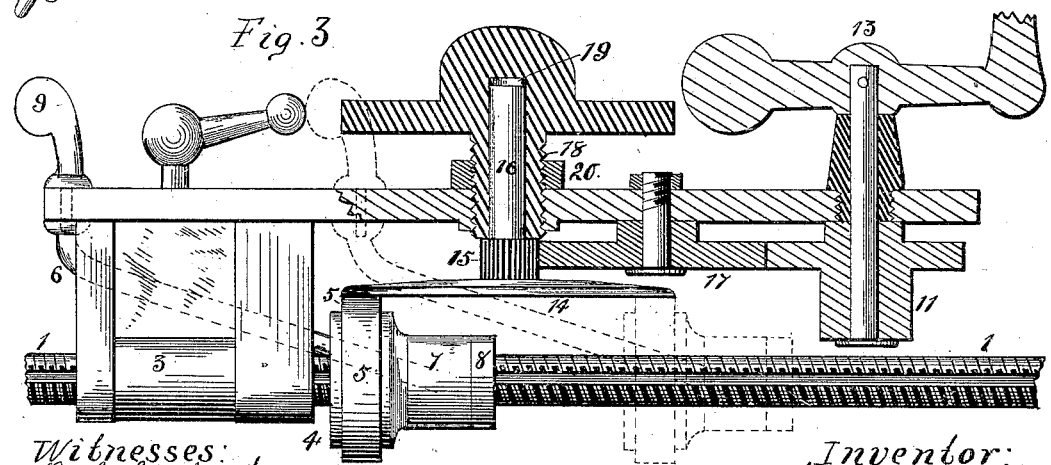

In the accompanying drawings, Figure 1 is a face view of the apron of the tool-carriage. Fig. 2 is an inner face view of the same, showing parts in section. Fig. 3 is a plan view of the apron with some of its parts in section. Fig. 4 is a side elevation of a lathe, showing the adaptation of my improved tool-carriage.

The tool-carriage that I have shown in the drawings, and will now proceed to explain, has the ordinary means of moving it lengthwise of the table in addition to my improvements, which consists of friction mechanism. The screw 1, which is driven from the headstock by its gear-connection therewith, has a connection with the apron 2 of the tool-carriage by means of the two half screw-nuts 3, that are closed upon the shaft when it is desired to connect the carriage and shaft, and by opening the jaws the screw has no connection with the carriage through this medium. This construction of devices has been patented to me, and therefore I do not lay any construction claims to the same, but only in combination with other parts. This connection of the screw with the carriage is employed when great accuracy is required, such as screw-cutting. For convenience and simplicity, I have employed the same screw 1 to operate my improved friction mechanism, and in doing so I groove the screw lengthwise, as shown at Figs. 2 and 3, and splined thereon a friction-wheel 4, having its face 5 of elastic material. By thus splining the wheel to the screw it has a movement lengthwise of the shaft, in addition to being rotated thereby. This wheel is held in a position relative to the carriage by an arm 6, extending in the lengthwise direction of the screw-shaft, and having an end 7 in collar form surrounding the hub of the friction-wheel, so that the wheel can rotate therein. A collar 8 holds the collar 7 to the wheel. The free end of the arm is bent downward, and by a handle 9, having a screw-threaded shank passing through an elongated slot 10 in the apron of the carriage, the arm can be connected to the apron, and can be adjusted lengthwise in the slot 10, and can be held, when adjusted, by tightening the handle 9 until it clamps the parts to the apron. The apron has a pinion 11 supported thereby, the teeth of which engage the teeth of a rack 12 on the front side of the bed of the lathe. A handle 13 is connected to the pinion, and furnishes means for moving the carriage by hand, when desired. A friction-disk 14 has a pinion 15 on its rear face, and a shank 16 extends therefrom. An intermediate toothed wheel 17 connects the two pinions 11 and 15 and transmits motion from one to the other.

The friction-disk 14 is rotated by friction contact with the friction-wheel 4, and the means for moving the disk in contact with the wheel consists of an externally screw-threaded shank 18, which has a screw-thread connection with the apron. The outer end of the shank is formed with projections, which gives a hold for the hand, by which the shank can be operated. The shank 16 of the disk enters a central opening 19 in the shank, which serves as a bearing in which the disk may revolve. When it is desired to move the disk into engagement with the wheel, the inner end of the shank comes in contact with the rear face of the pinion 15, and by turning the shank to the right it is moved inward, consequently moving the disk to the wheel, thereby forming a friction contact, and a collar 20, which has a screw-thread connection with the shank outside of the apron, comes against the face of the apron, limiting the endwise movement of the shank. This collar when adjusted on the shank is clamped by a screw 21, connecting the ends of the collar. In turning the shank 18 to the left the disk will of its own accord retract from its engagement with the wheel. This movement of the disk is limited by the collar 20 coming against a stop 22 in the face of the apron. When the disk is in engagement with the wheel and the wheel being revolved, a rotary movement will be imparted to the disk, and by its gear-connection with the pinion 11 and the teeth of the pinion in mesh with the teeth of the rack 12 the carriage will be moved lengthwise of the bed of the lathe.

With the parts in the position shown in solid lines at Fig. 3 the carriage will move toward the head-stock of the lathe, and its movement will be slow, owing to the wheel revolving in contact with the face of the disk near its periphery. When the speed of the carriage is required to be increased, the wheel is moved toward the center of the disk and secured when adjusted.

The movement of the carriage may be reversed by moving the wheel across the face of the disk, so that it will be revolved in the opposite direction. By throwing the disk out of engagement with the wheel the carriage can be moved in either direction by the hand-lever 13 or by throwing the two half-nuts 3 in engagement with the screw 1. In this instance I have shown the carriage operated by a grooved screw 1. This construction I prefer when I employ the two half-nuts 3 or their equivalent; but should I employ the friction mechanism only for moving the carriage a plain grooved rod will answer the purpose as well, or a combination of both may be employed without departing from the scope of my invention.

I claim as my invention—

1. In a lathe, the combination of a lathe-bed, a tool-carriage, a driving-shaft, a friction-and-gear connection between the driving-shaft and lathe-bed, the friction mechanism consisting of two parts—viz., a disk and wheel—one of said parts movable into and out of frictional contact with the other part to stop or start the movement of the carriage, substantially as set forth.

2. In a lathe, the combination of a lathe-bed, a driving-shaft, and a tool-carriage, of friction mechanism forming a connection between the shaft and lathe-bed, consisting of a disk and wheel having a bodily movement in unison with the carriage, by means of which movement is imparted to the carriage, substantially as set forth.

3. In a lathe, the combination of a lathe-bed, a driving-shaft, and a tool-carriage, of friction mechanism forming a connection between the shaft and lathe-bed, and consisting of a disk and wheel having a movement in unison with the tool-carriage, the wheel having a movement across the face of the disk, and an arm connected with the wheel and having a sliding connection with the carriage, whereby the wheel can be held in its adjusted position, substantially as set forth.

4. In a lathe, the combination of a driving-shaft, a friction-wheel carried thereby, the apron of a tool-carriage supporting a friction-disk, a hand-wheel having a screw-connection with the apron and engaging the disk, and jam-nut on the hand-wheel for regulating the endwise movement of the disk, substantially as set forth.

5. In a lathe, the combination of a tool-carriage, a toothed rack, a driving-shaft, and a friction-and-gear connection between the shaft and rack, said friction mechanism consisting of a disk and wheel having a friction engagement with each other, substantially as set forth.

6. In a lathe, the combination of a tool-carriage, a toothed rack, a driving-shaft, a friction-and-gear connection between the shaft and rack, one part of said friction mechanism having an adjustment toward and away from the axis of the other part to produce a quick or slow movement of the carriage, substantially as set forth.

7. In a lathe, the combination of a tool-carriage, a toothed rack, a driving-shaft, and a friction-and-gear connection between the shaft and rack, substantially as set forth.

8. In a lathe, the combination of a tool-carriage, a toothed rack, a screw-driving shaft, a friction-and-gear connection between the shaft and rack, said friction mechanism consisting of a disk and wheel, the disk having an adjustment toward or from the wheel to start or impart movement to the carriage, and a direct connection between the shaft and carriage, by means of which a positive movement will be imparted to the carriage when the friction mechanism is idle, substantially as set forth.

9. In a lathe, the combination of a tool-carriage, a toothed rack, a lengthwise-slotted screw-driving shaft, a friction-and-gear connection between the shaft and rack, and a connection between the shaft and carriage, substantially as set forth.

WILLIAM F. BARNES.

Witnesses:
A. O. BEHEL,
E. BEHEL.